(12) United States Patent
Lee et al.

(10) Patent No.: US 7,736,123 B2
(45) Date of Patent: Jun. 15, 2010

(54) PLASMA INDUCED VIRTUAL TURBINE AIRFOIL TRAILING EDGE EXTENSION

(75) Inventors: Ching-Pang Lee, Cincinnati, OH (US); Aspi Rustom Wadia, Loveland, OH (US); David Glenn Cherry, Loveland, OH (US); Je-Chin Han, College Station, TX (US)

(73) Assignee: General Electric Company, Schenectady, NY (US)

( * ) Notice: Subject to any disclaimer, the term of this patent is extended or adjusted under 35 U.S.C. 154(b) by 804 days.

(21) Appl. No.: 11/639,878

(22) Filed: Dec. 15, 2006

(65) Prior Publication Data

US 2008/0145233 A1 Jun. 19, 2008

(51) Int. Cl.
*F01D 17/20* (2006.01)
(52) U.S. Cl. .............................. 415/1; 415/10; 415/914
(58) Field of Classification Search ................... 415/1, 415/10, 115, 116, 914; 416/95, 96 A, 96 R, 416/97 R
See application file for complete search history.

(56) References Cited

U.S. PATENT DOCUMENTS

| | | | | |
|---|---|---|---|---|
| 4,504,189 | A | * | 3/1985 | Lings .......................... 415/115 |
| 5,181,379 | A | | 1/1993 | Wakeman et al. |
| 5,233,828 | A | | 8/1993 | Napoli |
| 5,241,827 | A | | 9/1993 | Lampes |
| 5,320,309 | A | * | 6/1994 | Nosenchuck et al. ......... 244/205 |
| 5,337,568 | A | | 8/1994 | Lee et al. |
| 5,419,681 | A | | 5/1995 | Lee |
| 5,465,572 | A | | 11/1995 | Nicoll et al. |
| 5,503,529 | A | | 4/1996 | Anselmi et al. |
| 5,651,662 | A | | 7/1997 | Lee et al. |
| 5,660,525 | A | | 8/1997 | Lee et al. |
| 5,747,769 | A | | 5/1998 | Rockstroh et al. |

(Continued)

FOREIGN PATENT DOCUMENTS

EP 1906136 A1 9/2008

(Continued)

OTHER PUBLICATIONS

European Search Report and Opinion, Application No. EP07254056, Mar. 12, 2009, 10 pages.

(Continued)

*Primary Examiner*—Edward Look
*Assistant Examiner*—Sean J Younger
(74) *Attorney, Agent, or Firm*—William Scott Andes; Steven J. Rosen

(57) ABSTRACT

A trailing edge vortex reducing system includes a gas turbine engine airfoil extending in a spanwise direction, one or more spanwise extending plasma generators in a trailing edge region around a trailing edge of the airfoil. The plasma generators may be mounted on an outer wall of the airfoil with first and second pluralities of the plasma generators on pressure and suction sides of the airfoil respectively. The plasma generators may include inner and outer electrodes separated by a dielectric material disposed within a grooves in an outer hot surface of the outer wall of the airfoil. The plasma generators may be located at an aft end of the airfoil and the inner electrodes flush with the trailing edge base. A method for operating the system includes energizing one or more of plasma generators in steady state or unsteady modes.

42 Claims, 8 Drawing Sheets

U.S. PATENT DOCUMENTS

| | | | |
|---|---|---|---|
| 6,514,037 B1 * | 2/2003 | Danowski et al. | 415/115 |
| 6,570,333 B1 * | 5/2003 | Miller et al. | 315/111.21 |
| 6,619,030 B1 | 9/2003 | Seda et al. | |
| 6,655,149 B2 | 12/2003 | Farmer et al. | |
| 6,708,482 B2 | 3/2004 | Seda | |
| 6,732,502 B2 | 5/2004 | Seda et al. | |
| 6,761,956 B2 | 7/2004 | Lee et al. | |
| 6,805,325 B1 * | 10/2004 | Malmuth et al. | 244/205 |
| 6,991,430 B2 | 1/2006 | Stec et al. | |
| 7,008,179 B2 | 3/2006 | Rinck et al. | |
| 7,094,027 B2 | 8/2006 | Turner et al. | |
| 2006/0005545 A1 | 1/2006 | Samimy et al. | |
| 2006/0104807 A1 | 5/2006 | Lee | |

FOREIGN PATENT DOCUMENTS

| | | | |
|---|---|---|---|
| WO | WO2005/114013 A1 | 12/2005 | |

OTHER PUBLICATIONS

AIAA 2007-647, Stereo PIV of a Turbine Tip Clearance Flow with Plasma Actuation, Daniel K. Van Ness II, Thomas C. Corke, and Scott C. Morris, 22 pages.

AIAA 2006-20, "Turbine Blade Tip Leakage Flow Control by Partial Squealer Tip and Plasma Actuators", Travis Douville, Julia Stephens, Thomas Corke, and Scott Morris, 18 pages.

AIAA 2005-782, "Tip Clearance Control Using Plasma Actuators", Scott C. Morris, Thomas C. corke, Daniel Van Ness, Julia Stephens, and Travis Douville, 8 pages.

XP007907306, "Active Flow Control in Turbomachinery Using Phased Plasma Actuators", B. Goksel and I. Rechenberg, 2 pages.

XP009112404, "Turbine Tip Clearance Flow Control using Plasma Actuators", Daniel K. Van Ness II, Thomas Co. Corke, and Scott C. Morris, 12 pages.

Science Direct, "SDBD plasma enhanced aerodynamics: concepts optimization and applications", Thomas C. Corke, Martiqua L. Post, and Dmitry M. Orlov, 26 pages.

XP007907356, "Plasma (physics)", From Wikipedia, 16 pages.

XP007907353, "Dielectric barrier discharge", From Wikipedia, 2 pages.

"Overview of Plasma Flow Control: Concepts, Optimization, and Applications", Thomas C. Corke and Martiqua L. Post, 43rd AIAA Aerospace Sciences Meeting and Exhibit, Jan. 10-13, 2005, Reno, Nevada, AIAA 2005-563, 15 pages.

"Plasma Control Of Boundary Layer Using Low-Temperature Non-Equilibrium Plasma Of Gas Discharge", D.F. Opaits, D.V. Roupassov, S.M. Starikovskaia, A.Yu. Starikovskii, I.N. Zavialov, and S.G. Saddoughi, 43rd AIAA Aerospace Sciences Meeting and Exhibit, Jan. 10-13, 2005, Reno, Nevada, AIAA 2005-1180, 6 pages.

"Demonstration Of Separation Delay With Glow-Discharge Plasma Actuators", Lennart S. Hultgren and David E. Ashpis, 41st AIAA Aerospace Sciences Meeting and Exhibit, Jan. 6-9, 2003, Reno, Nevada, AIAA 2003-1025, 10 pages.

"Unsteady Plasma Actuators for Separation Control of Low-Pressure Turbine Blades", Junhui Huang, Thomas C. Corke and Flint O. Thomas, AIAA Journal, vol. 44, No. 7, Jul. 2006, pp. 1477-1487.

"Control of Separation in Turbine Boundary Layers", R.B. Rivir, R. Sondergaard, J.P. Bons, and N. Yurchenko, 2nd AIAA Flow Control Conference, Jun. 28-Jul. 1, 2004, Portland, Oregon, 16 pages.

"Plasma Flow Control Optimized Airfoil", Thomas C. Corke, Benjamin Mertz, and Mehul P. Patel, 44th AIAA Aerospace Sciences Meeting and Exhibit, Jan. 9-12, 2006, Reno, Nevada, AIAA 2006-1208, 13 pages.

"Control of Transitional and Turbulent Flows Using Plasma-Based Actuators", Miguel R. Visbal, Datta V. Gaitonde, and Subrata Roy, 36th AIAA Fluid Dynamics Conference and Exhibit, Jun. 5-8, 2006, San Francisco, California, AIAA 2006-3230, 22 pages.

"AC and Pulsed Plasma Flow Control", R. Rivir, A. White, C. Carter, B. Ganguly, J. Jacob, A. Forelines, and J. Crafton, 42nd AIAA Aerospace Sciences Meeting and Exhibit, Jan. 5-8, 2004, Reno, Nevada, AIAA 2004-847, 9 pages.

"Effects Of Plasma Induced Velocity On Boundary Layer Flow", Brian E. Balcer, Milton E. Franke, and Richard B. Rivir, 44th AIAA Aerospace Sciences Meeting and Exhibit, Jan. 9-12, 2006, Reno, Nevada, AIAA 2006-875, 12 pages.

"Flow Control Using Plasma Actuators and Linear / Annular Plasma Synthetic Jet Actuators", Arvind Santhanakrishan, Jamey D. Jacob, and Yildirim B. Suzen, 3rd AIAA Flow Control Conference, Jun. 5-8, 2006, San Francisco, California, AIAA 2006-3033, 31 pages.

"Turbulent Drag Reduction by Surface Plasma through Spanwise Flow Oscillation", Timothy N. Jukes, Kwing-So Choi, Graham A. Johnson, and Simon J. Scott, 3rd AIAA Flow Control Conference, Jun. 5-8, 2006, San Francisco, California, AIAA 2006-3693, 14 pages.

* cited by examiner

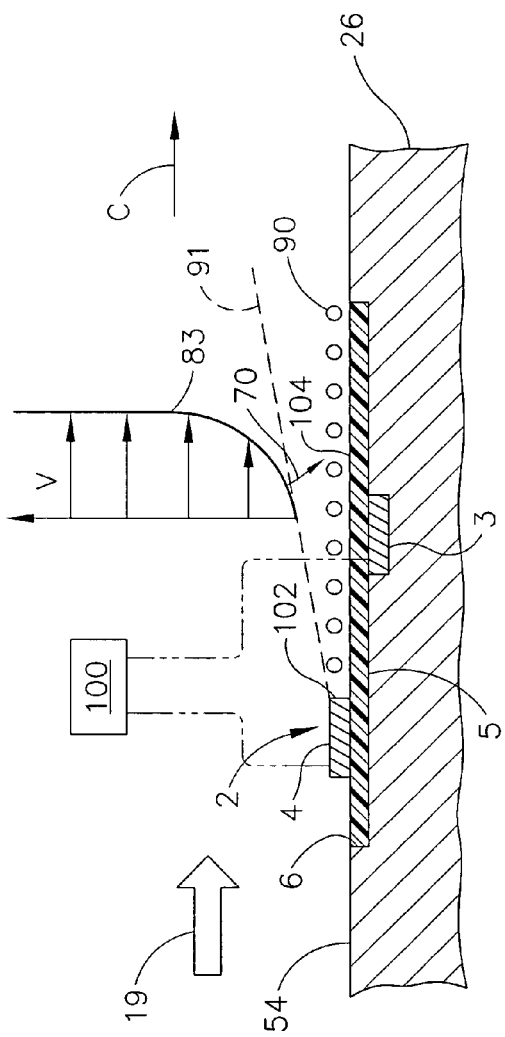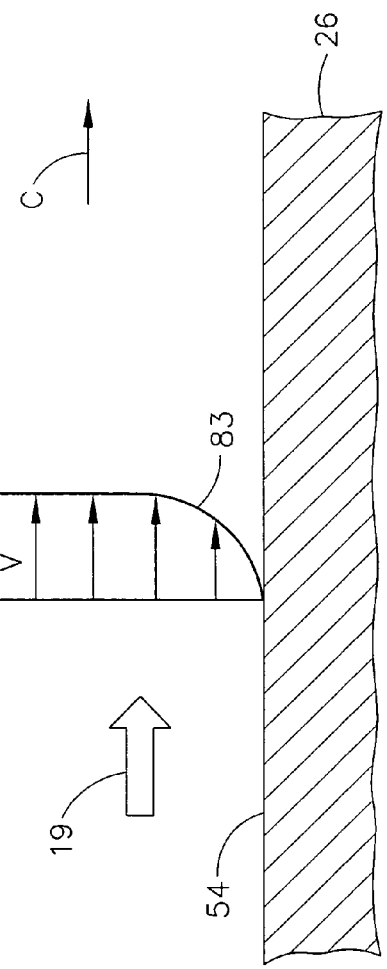

PLASMA INDUCED VIRTUAL TURBINE AIRFOIL TRAILING EDGE EXTENSION

BACKGROUND OF THE INVENTION

1. Field of the Invention

The invention relates to aerodynamics of turbine airfoils and, in particular, turbine airfoil trailing edges.

2. Description of Related Art

A typical gas turbine engine of the turbofan type generally includes a forward fan and a booster or low pressure compressor, a middle core engine, and a low pressure turbine which powers the fan and booster or low pressure compressor. The core engine includes a high pressure compressor, a combustor and a high pressure turbine in a serial flow relationship. The high pressure compressor and high pressure turbine of the core engine are connected by a high pressure shaft. High pressure air from the high pressure compressor is mixed with fuel in the combustor and ignited to form a very hot high energy gas flow. The gas flow passes through the high pressure turbine, rotatably driving it and the high pressure shaft which, in turn, rotatably drives the high pressure compressor.

The gas flow leaving the high pressure turbine is expanded through a second or low pressure turbine. The low pressure turbine rotatably drives the fan and booster compressor via a low pressure shaft. The low pressure shaft extends through the high pressure rotor. Most of the thrust produced is generated by the fan. Marine or industrial gas turbine engines have low pressure turbines which power generators, ship propellers, pumps and other devices while turboprops engines use low pressure turbines to power propellers usually through a gearbox.

The high and low pressure turbines have at least one turbine nozzle including at least one row of circumferentially spaced apart airfoils or vanes radially extending between radially inner and outer bands. The vanes are usually hollow having an outer wall that is cooled with cooling air from the compressor. Hot gases flowing over the cooled turbine vane outer wall produces flow and thermal boundary layers along hot outer surfaces of the vane outer wall and end wall hot surfaces of the inner and outer bands over which the hot gases pass. The high and low pressure turbines also have at least one row of turbine rotor blades including circumferentially spaced apart airfoils extending radially outwardly from turbine blade platforms. High pressure turbine airfoils, including stator vanes and rotor blades, typically require internal convection cooling and external film cooling. These airfoils are typically cast including internal cooling features such as cooling air passages and pins and turbulators. Therefore, the turbine airfoils are usually thicker than the compressor airfoils. The trailing edges of some turbine airfoils are tapered down to about 30 to 50 mills. When the hot gas flows over the turbine airfoils, there is vortex shedding at the trailing edge base due to the pressure gradient caused by the thickness of the trailing edge. This vortex shedding causes undesirable pressure losses which are sometimes referred to as blockage effects. Due to the mechanical and casting constraints, the trailing edge thickness cannot be physically further reduced. It is desirable to be able to reduce or eliminate this undesirable pressure losses due to the vortex shedding for better turbine efficiency.

SUMMARY OF THE INVENTION

A trailing edge vortex reducing system includes a gas turbine engine airfoil extending in a chordwise direction between a leading edge and a trailing edge of the airfoil and extending outwardly in a spanwise direction from an airfoil base to an airfoil tip. The airfoil includes pressure and suction sides extending in the chordwise direction between the leading edge and the trailing edge. The airfoil further includes a trailing edge base at the trailing edge and a trailing edge region around the trailing edge and including the trailing edge base. One or more plasma generators extend in the spanwise direction in the trailing edge region.

The plasma generators may be mounted on an outer wall of the airfoil. First and second pluralities of the plasma generators may be mounted on a pressure and suction sides of the airfoil respectively. The plasma generators may have inner and outer electrodes separated by a dielectric material and the dielectric material may be disposed within a groove in an outer hot surface of an outer wall of the airfoil. An AC power supply is connected to the electrodes to supply a high voltage AC potential to the electrodes. The plasma generators may also placed further aft or downstream in the trailing edge region along the pressure side and/or the suction side bordering and flush with the trailing edge base.

The system may be used with a high pressure turbine nozzle vane including the airfoil extending radially in a spanwise direction between radially inner and outer bands. The system may be used a high pressure turbine blade including the airfoil extending radially outwardly from an airfoil base on a blade platform.

One method for operating the trailing edge vortex reducing system includes energizing one or more of the plasma generators in the trailing edge region of the gas turbine engine airfoil. The plasma generators may be operated in steady state or unsteady modes.

BRIEF DESCRIPTION OF THE DRAWINGS

The foregoing aspects and other features of the invention are explained in the following description, taken in connection with the accompanying drawings where:

FIG. 7 is a schematical illustration of the trailing edge vortex reducing system with the plasma generators illustrated in FIG. 4 energized.

FIG. 8 is a schematical illustration of the trailing edge vortex reducing system with the plasma generators illustrated in FIG. 4 turned off.

DETAILED DESCRIPTION OF THE INVENTION

Figure 1:
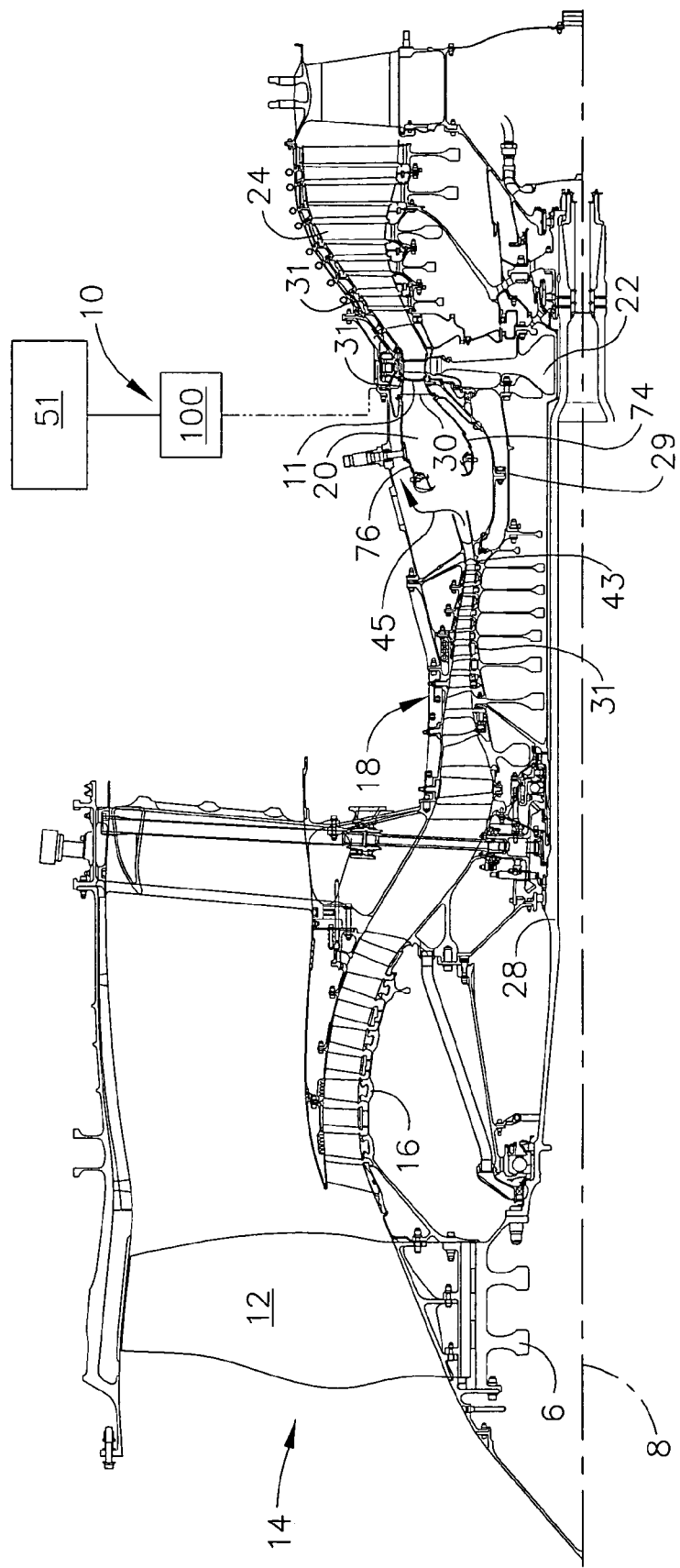
FIG. 1 is a longitudinal, sectional view illustration of exemplary embodiment of an aircraft gas turbine engine with a trailing edge vortex reducing system illustrated for turbine vanes and rotor blades of a high pressure turbine section of the engine.

Illustrated in FIG. 1 is an exemplary turbofan gas turbine engine 10 circumscribed about an engine centerline axis 8 and having a fan 12 which receives ambient air 14, a booster or low pressure compressor (LPC) 16, a high pressure compressor (HPC) 18, a combustor 20, a high pressure turbine (HPT) 22, and a low pressure turbine (LPT) 24 from which combustion gases are discharged from the engine 10. The HPT 22 is joined to the HPC 18 to substantially form a high pressure rotor 29. A low pressure shaft 28 joins the LPT 24 to both the fan 12 and the low pressure compressor 16. The second or low pressure shaft 28 which is at least in part rotatably disposed co-axially with and radially inwardly of the first or high pressure rotor. The main combustor 20 includes inner and outer combustor liners 74, 76. The main combustor 20 mixes fuel with the air 14 pressurized by the HPC 18 for generating combustion gases or gas flow 19 which flows downstream through the turbines.

Illustrated in FIGS. 2-5 is the turbine nozzle 30 of the high pressure turbine 22 through which the hot gas flow 19 is discharged into from the combustor 20. The exemplary embodiment of the turbine nozzle 30 illustrated herein, also more generally referred to as a vane assembly 31, includes a row 33 of circumferentially spaced apart vanes 32. The vanes 32 have airfoils 39 extending radially in a spanwise direction SD between radially inner and outer bands 38, 40, respectively. Each of the airfoils 39 extends in a chordwise direction C between a leading edge LE and a trailing edge TE of the airfoil and extends radially outwardly in the spanwise direction SD from an airfoil base 84 to an airfoil tip 82. The trailing edge TE has an aft or downstream facing surface referred to as a trailing edge base 34. In the exemplary embodiment of the turbine nozzle 30 illustrated herein, the bands and the airfoils are formed in circumferential segments 42 typically with two airfoils 39 per segment 42. There may be more than two segments and the segments typically have axial split lines suitably joined together by conventional spline seals therebetween.

Each airfoil 39 includes an outer wall 26 having a pressure side 46 and a circumferentially opposite suction side 48 which extend axially in a chordwise direction C between the opposite leading and trailing edges LE, TE, respectively. The airfoils 39 and the outer walls 26 extend radially in a spanwise direction SD between the inner and outer bands 38, 40. Each of the airfoils 39 has a radially measured span S extending from the inner band 38 to the outer band 40. The hot combustion gas flow 19 pass through flow passages 50 between the airfoils 39. The flow passages 50 are bound by inboard hot surfaces 52, with respect to the gas flow 19, of the inner and outer bands 38, 40 and outer hot surfaces 54 of the outer wall 26 along the pressure and suction sides 46, 48 of the airfoils 39. The high pressure turbine 22 includes at least one row of circumferentially spaced apart high pressure turbine blades 80. Each of the turbine blades 80 has a turbine airfoil 39 extending radially outwardly from an airfoil base 84 on a blade platform 86 to an airfoil tip 82. The turbine airfoil 39 has a radially measured span S extending from the blade platform 86 to an airfoil tip 82. The airfoils taper down in a downstream or aft direction through the airfoil trailing edge TE to the aft or downstream facing airfoil base.

Figure 2:
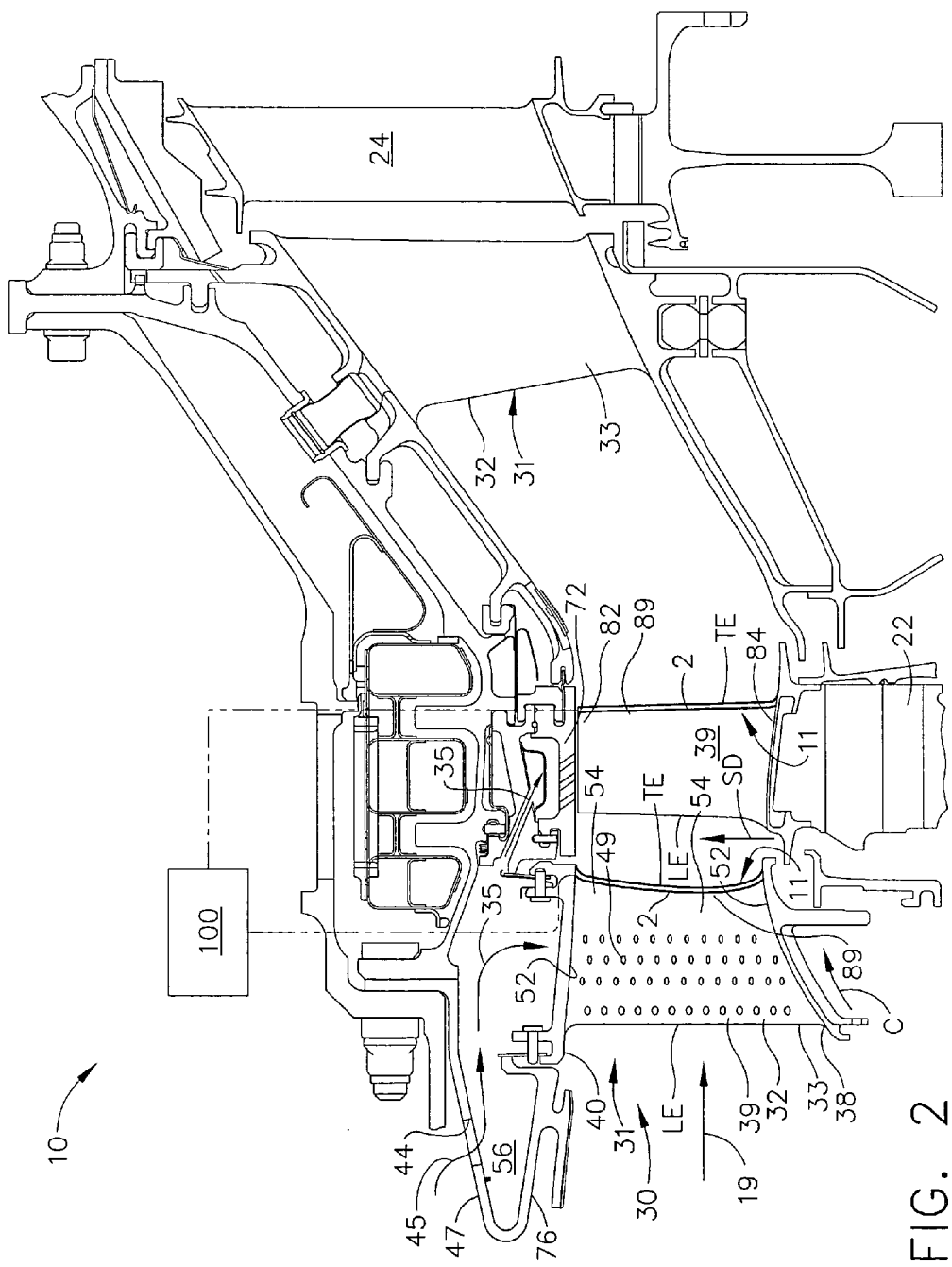
FIG. 2 is an enlarged view of the vanes and blades illustrated in FIG. 1.
Figure 3:
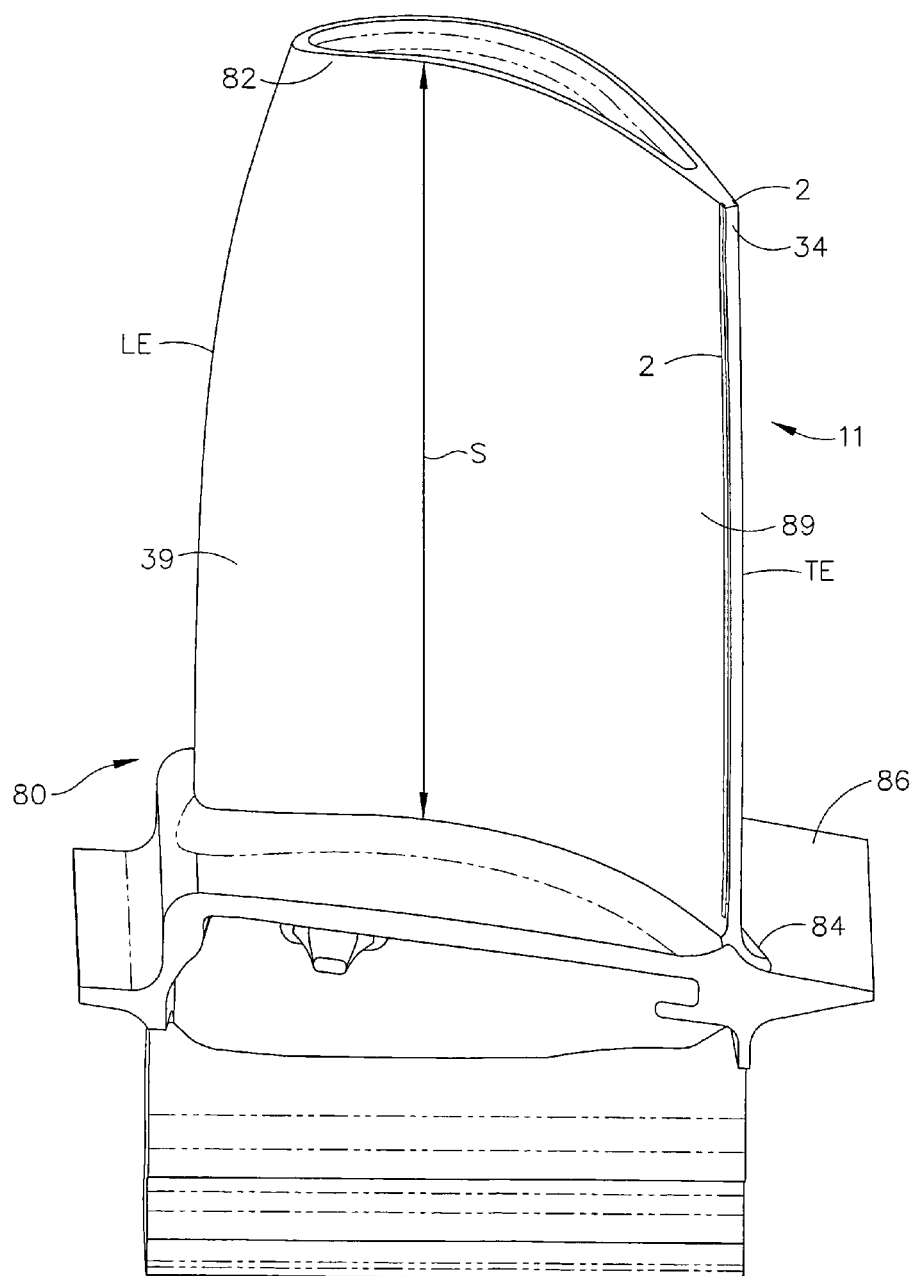
FIG. 3 is a perspective view of the blade and plasma generators illustrated in FIG. 2.
Figure 4:
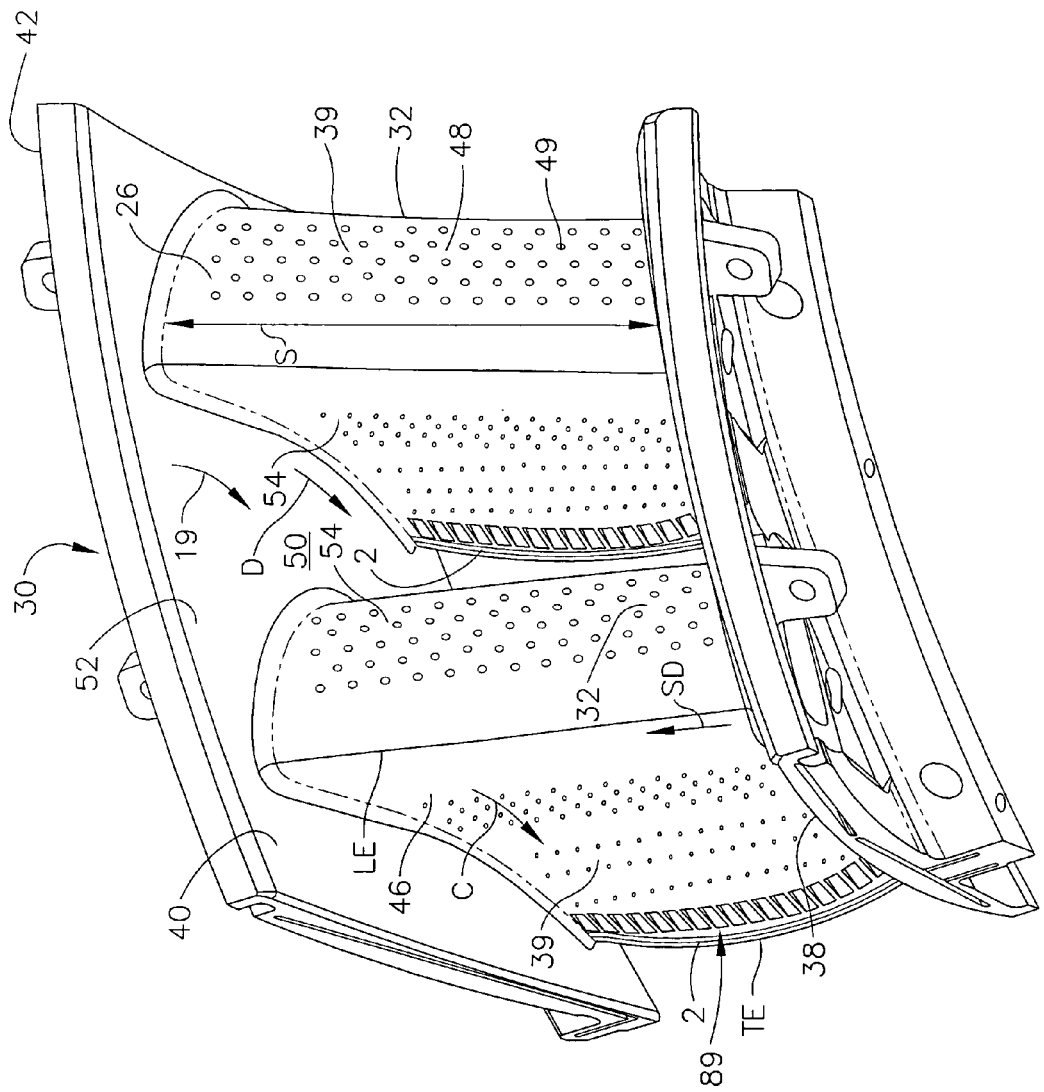
FIG. 4 is a perspective view of the vanes and plasma generators of a vane assembly illustrated in FIG. 2.

A portion of compressor discharge air 45 is used to supply pressurized cooling air 35 to the turbine nozzle 30 for cooling the various components thereof including the hollow airfoils 39 and inner and outer bands. Cooling air 35 is also used to film cool an annular shroud 72 surrounding rotatable blade tips 82 of the high pressure turbine 22. The outer walls 26 are film cooled by using pressurized cooling air 35 which is a portion of the compressor discharge air 45 from a last high pressure compressor stage 43 at a downstream end of the high pressure compressor 18 as illustrated in FIGS. 1 and 2. The portion of the compressor discharge air 45 flows around the outer combustor liner 76 and through liner apertures 44 in a downstream flange 47 of the outer combustor liner 76 into a cooling air plenum 56. The portion of the compressor discharge air 45 that flows into the cooling air plenum 56 is used as the cooling air 35 and flows into hollow interiors of the airfoils 39. Film cooling apertures 49 extend across the wall 26 from the hollow interiors to the outer hot surface 54 of the wall 26 in a generally downstream direction D.

Figure 6:
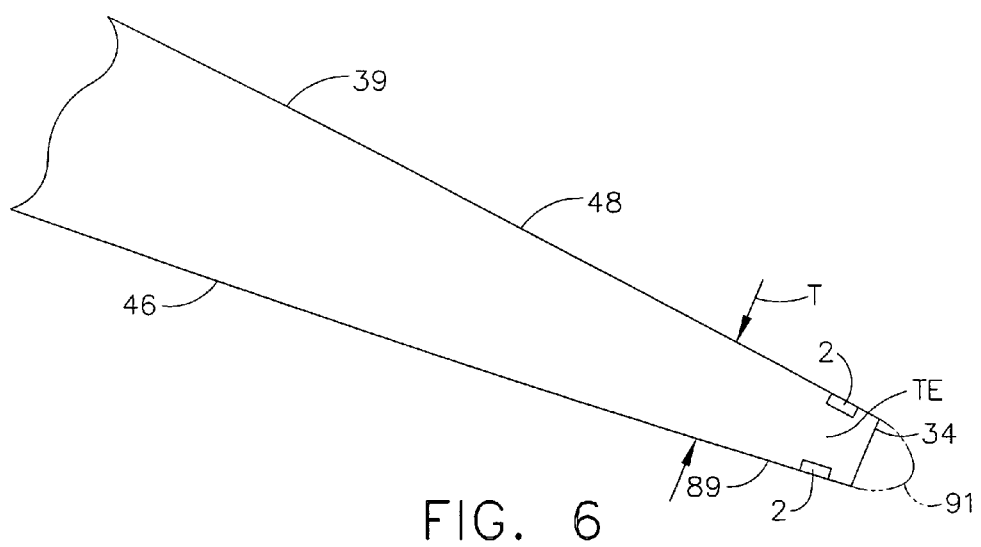
FIG. 6 is a cross sectional view illustration through the trailing edge region illustrated in FIG. 5.

The gas flow 19 flowing along the pressure and suction sides 46, 48 of the airfoils 39 causes vortex shedding at the trailing edge base 34 due to the pressure gradient caused by the thickness T of the trailing edge TE, as illustrated in FIG. 6. This vortex shedding causes undesirable pressure losses. Sometimes, these losses are referred as blockage effects. Due to the mechanical and casting constraints, the trailing edge thickness cannot be physically further reduced. A trailing edge vortex reducing system 11 is used to reduce or minimize the strength of the vortices shedding at the trailing edge base 34 in a trailing edge region 89 between the pressure and suction sides 46, 48 of the airfoils 39. The trailing edge vortex reducing system 11 produces a downstream tapering plasma induced virtual trailing edge extension 91 that aerodynamically reduces the effective trailing edge thickness for better turbine efficiency.

Figure 5:
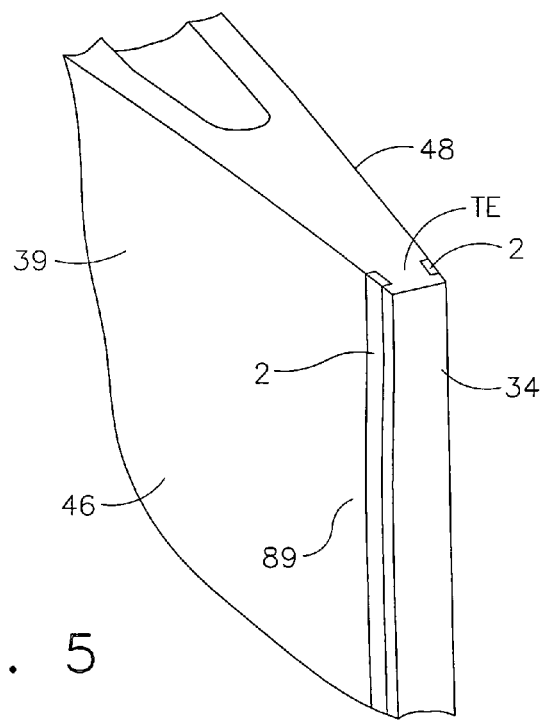
FIG. 5 is a perspective view a trailing edge region of an airfoil of a vane or blade illustrated in FIG. 2.
Figure 9:
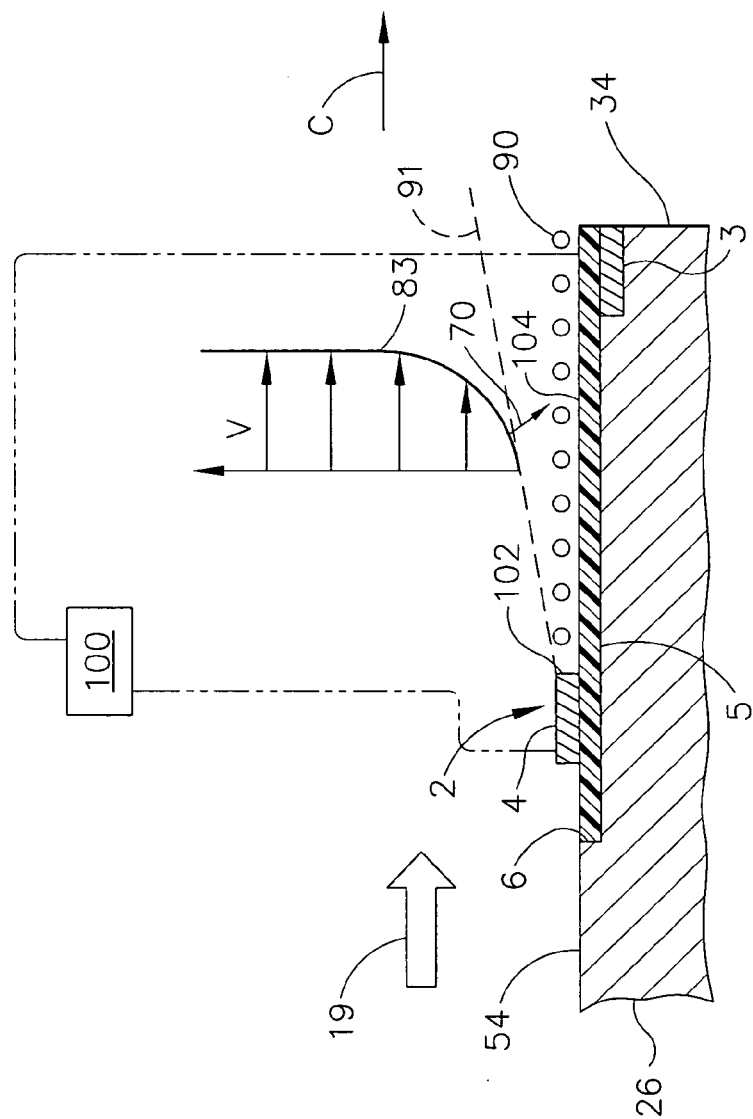
FIG. 9 is a cross sectional view illustration through the trailing edge region illustrated in FIG. 5 with the plasma generators in an aft corner of trailing edge and partially flush with a trailing edge base of the airfoil.
Figure 10:
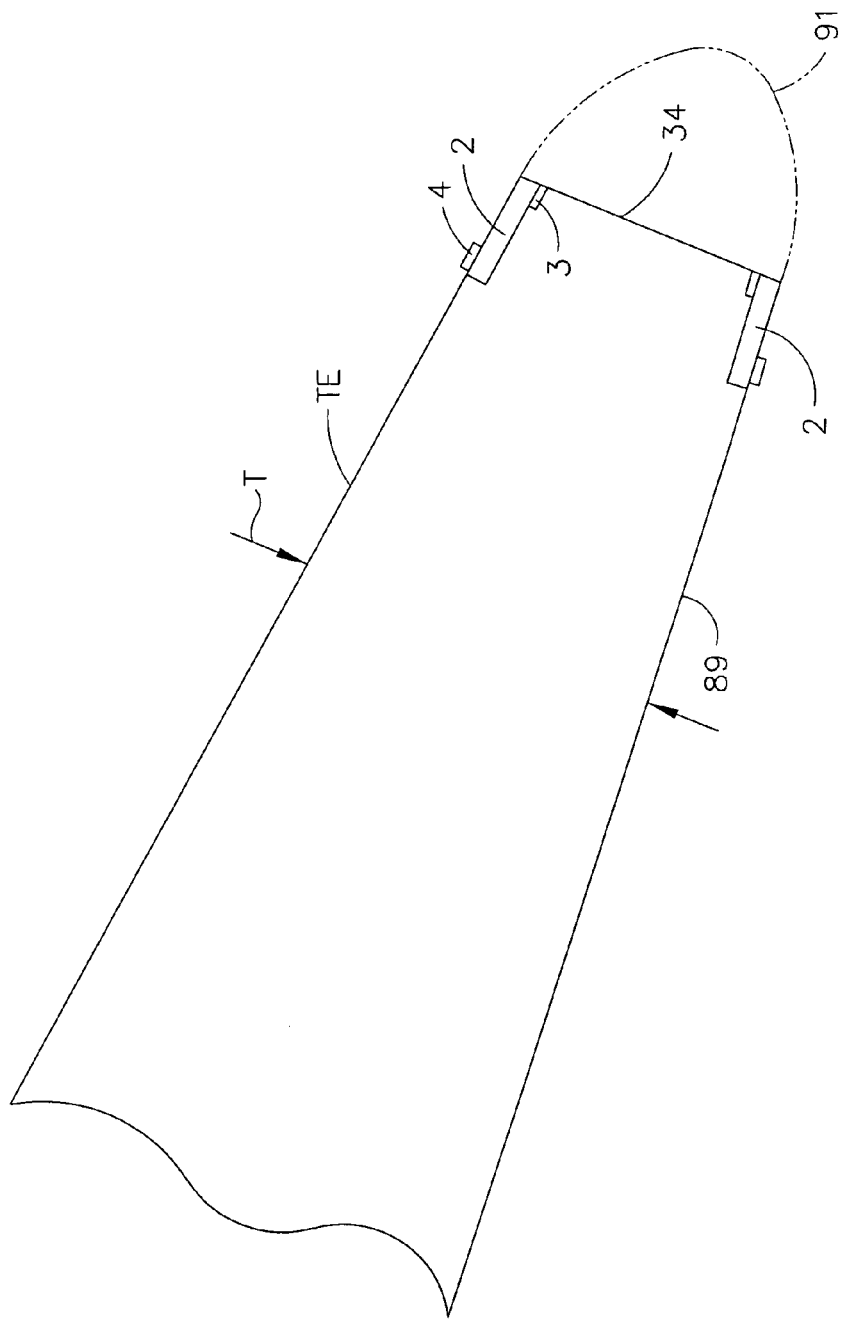
FIG. 10 is a schematical illustration of the trailing edge vortex reducing system with the plasma generators illustrated in FIG. 9 energized.

Referring to FIGS. 5 and 6, the exemplary embodiment of the trailing edge vortex reducing system 11 illustrated herein has generally spanwise or radially extending plasma generators 2 in the trailing edge region 89 of the airfoil 39 along the pressure side 46 and/or the suction side 48 near the trailing edge base 34 as illustrated in FIGS. 5 and 6. The plasma generators 2 may also placed further aft or downstream in the trailing edge region 89 along the pressure side 46 and/or the suction side 48 bordering and flush with the trailing edge base 34 as illustrated in FIGS. 9 and 10. There may be one or more plasma generators 2 along each of the pressure and suction sides 46, 48. The plasma generators 2 may extend partway along the span S of the airfoil 39. The trailing edge region 89 includes the trailing edge base 34 and extends chordwise from the trailing edge base 34 around the airfoil 39 through small portions of the pressure and the suction sides 46, 48 of the airfoil 39.

In the exemplary embodiment of the trailing edge vortex reducing system 11 illustrated herein, one plasma generator 2 is mounted on each of the pressure and the suction sides 46, 48 and trailing edge base 34 of the airfoil 39 in the trailing edge region 89. The plasma generators 2 are operable for producing a plasma 90 of ionized air which induces boundary layer flow from the pressure side and/or the suction side to flow to the trailing edge base 34 and form an extended tapering virtual trailing edge extension 91 extending in the downstream direction D or aftwardly from the trailing edge base 34. The virtual trailing edge extension 91 reduces or eliminates vortex shedding at the trailing edge base 34 due to the pressure gradient caused by the thickness T of the trailing edge TE, as illustrated in FIG. 6. This reduces or eliminates undesirable pressure losses. The virtual trailing edge extension 91 aerodynamically reduces the effective trailing edge thickness for better turbine efficiency.

Referring to FIG. 7, each of the plasma generators 2 includes inner and outer electrodes 3, 4 separated by a dielectric material 5. The dielectric material 5 is disposed within spanwise extending grooves 6 in the outer hot surfaces 54 of outer walls 26 of the airfoils 39 and, in particular, on the pressure and the suction sides 46, 48 and trailing edge base 34 of the airfoil 39 in the trailing edge region 89. An AC power supply 100 is connected to the electrodes to supply a high voltage AC potential to the electrodes. When the AC amplitude is large enough, the gas flow 19 ionizes in a region of the largest electric potential forming the plasma 90. As mentioned above, the plasma generators 2 may also placed further aft or downstream in the trailing edge region 89 along the pressure side 46 and/or the suction side 48 such that the inner electrodes 3 are flush with the trailing edge base 34 as illustrated in FIGS. 9 and 10.

The plasma 90 generally begins at an edge 102 of the outer electrode 4 which is exposed to the gas flow 19 and spreads out over an area 104 projected by the outer electrode 4 which is covered by the dielectric material 5. When the plasma generators 2 on the pressure side and/or suction side are turned on, the plasma 90 causes an induced boundary layer flow 70 to flow from the boundary layer flow 83 from the pressure side and/or the suction side to flow to the trailing edge base 34 and form the extended tapering virtual trailing edge extension 91 extending in the downstream direction D or aftwardly from the trailing edge base 34.

When the plasma generators 2 are turned off, the virtual trailing edge extension 91 disappears and the trailing edge base 34 becomes the effective trailing edge in the trailing edge region 89. The plasma generators 2 may be operated in either steady state or unsteady modes. An electronic controller 51 may be used to control and turn on and off plasma generators 2 and an active clearance control system if the engine has one.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

1. A trailing edge vortex reducing system comprising:
    a gas turbine engine airfoil extending in a chordwise direction between a leading edge and a trailing edge of the airfoil and extending outwardly in a spanwise direction from an airfoil base to an airfoil tip,
    the airfoil having pressure and suction sides extending in the chordwise direction between the leading edge and the trailing edge,
    a trailing edge base at the trailing edge and a trailing edge region around the trailing edge and including the trailing edge base, and
    one or more plasma generators extending at least partway in the spanwise direction along the pressure side and/or the suction side in the trailing edge region.

2. A system as claimed in claim 1 further comprising the plasma generators being mounted on an outer wall of the airfoil.

3. A system as claimed in claim 2 further comprising a first plurality of the plasma generators on the pressure side of the airfoil and a second plurality of the plasma generators on the suction side of the airfoil.

4. A system as claimed in claim 2 further comprising a first one of the plasma generators on the pressure side of the airfoil and a second one of the plasma generators on the suction side of the airfoil.

5. A system as claimed in claim 1 further comprising the plasma generators including inner and outer electrodes separated by a dielectric material.

6. A system as claimed in claim 5 further comprising the plasma generators located at an aft end of the airfoil and the inner electrodes being flush with the trailing edge base.

7. A system as claimed in claim 5 further comprising the dielectric material being disposed within a groove in an outer hot surface of an outer wall of the airfoil.

8. A system as claimed in claim 7 further comprising a first plurality of the plasma generators on the pressure side of the airfoil and a second plurality of the plasma generators on the suction side of the airfoil.

9. A system as claimed in claim 7 further comprising a first one of the plasma generators on the pressure side of the airfoil and a second one of the plasma generators on the suction side of the airfoil.

10. A system as claimed in claim 7 further comprising a high pressure turbine nozzle vane including the airfoil extending radially in a spanwise direction between radially inner and outer bands.

11. A system as claimed in claim 7 further comprising a high pressure turbine blade including the airfoil extending radially outwardly from an airfoil base on a blade platform.

12. A trailing edge vortex reducing system comprising:
    a vane assembly including a row of circumferentially spaced apart and radially extending gas turbine engine vanes,
    each of the vanes having an airfoil extending radially in a spanwise direction between radially inner and outer bands,
    the airfoil having pressure and suction sides extending in a chordwise direction between the leading edge and the trailing edge,
    a trailing edge base at the trailing edge and a trailing edge region around the trailing edge and including the trailing edge base, and
    one or more plasma generators extending in the spanwise direction in the trailing edge region.

13. A system as claimed in claim 12 further comprising a first plurality of the plasma generators on the pressure side of the airfoil and a second plurality of the plasma generators on the suction side of the airfoil.

14. A system as claimed in claim 12 further comprising a first one of the plasma generators on the pressure side of the airfoil and a second one of the plasma generators on the suction side of the airfoil.

15. A system as claimed in claim 12 further comprising the plasma generators including inner and outer electrodes separated by a dielectric material and an AC power supply connected to the electrodes to supply a high voltage AC potential to the electrodes.

16. A system as claimed in claim 15 further comprising the plasma generators located at an aft end of the airfoil and the inner electrodes being flush with the trailing edge base.

17. A system as claimed in claim 15 further comprising the dielectric material being disposed within a grooves in an outer hot surface of an outer wall of the airfoil.

18. A system as claimed in claim 17 further comprising a first plurality of the plasma generators on the pressure side of the airfoil and a second plurality of the plasma generators on the suction side of the airfoil.

19. A system as claimed in claim 17 further comprising a first one of the plasma generators on the pressure side of the airfoil and a second one of the plasma generators on the suction side of the airfoil.

20. A trailing edge vortex reducing system comprising:
   a turbine assembly including a row of circumferentially spaced apart turbine blades,
   each of the turbine blades having a turbine airfoil extending radially outwardly in a spanwise direction from an airfoil base on a blade platform,
   the airfoil having pressure and suction sides extending in a chordwise direction between the leading edge and the trailing edge,
   a trailing edge base at the trailing edge and a trailing edge region around the trailing edge and including the trailing edge base, and
   one or more plasma generators extending in the spanwise direction in the trailing edge region.

21. A system as claimed in claim 20 further comprising a first plurality of the plasma generators on the pressure side of the airfoil and a second plurality of the plasma generators on the suction side of the airfoil.

22. A system as claimed in claim 20 further comprising a first one of the plasma generators on the pressure side of the airfoil and a second one of the plasma generators on the suction side of the airfoil.

23. A system as claimed in claim 20 further comprising the plasma generators including inner and outer electrodes separated by a dielectric material and an AC power supply connected to the electrodes to supply a high voltage AC potential to the electrodes.

24. A system as claimed in claim 23 further comprising the plasma generators located at an aft end of the airfoil and the inner electrodes being flush with the trailing edge base.

25. A system as claimed in claim 23 further comprising the dielectric material being disposed within a groove in an outer hot surface of an outer wall of the airfoil.

26. A system as claimed in claim 25 further comprising a first plurality of the plasma generators on the pressure side of the airfoil and a second plurality of the plasma generators on the suction side of the airfoil.

27. A system as claimed in claim 25 further comprising a first one of the plasma generators on the pressure side of the airfoil and a second one of the plasma generators on the suction side of the airfoil.

28. A method for operating a trailing edge vortex reducing system, the method comprising:
   energizing one or more spanwise extending plasma generators in a trailing edge region of a gas turbine engine airfoil,
   the airfoil extending in a chordwise direction between a leading edge and a trailing edge of the airfoil and extending outwardly in a spanwise direction from an airfoil base to an airfoil tip,
   the airfoil having pressure and suction sides extending in the chordwise direction between the leading edge and the trailing edge,
   a trailing edge base at the trailing edge, and the trailing edge region extending around the trailing edge and including the trailing edge base.

29. A method as claimed in claim 28 wherein the energizing further includes supplying an AC potential to inner and outer electrodes separated by a dielectric material of the plasma generator.

30. A method as claimed in claim 29 further comprising operating the plasma generator in steady state or unsteady modes.

31. A method as claimed in claim 29 further comprising operating the plasma generators located at an aft end of the airfoil and the inner electrodes being flush with the trailing edge base.

32. A method as claimed in claim 28 further comprising using a first plurality of the plasma generators mounted on the pressure side of the airfoil and a second plurality of the plasma generators mounted on the suction side of the airfoil.

33. A method as claimed in claim 28 further comprising using a first one of the plasma generators mounted on the pressure side of the airfoil and a second one of the plasma generators mounted on the suction side of the airfoil.

34. A method as claimed in claim 33 wherein the energizing further includes supplying an AC potential to inner and outer electrodes separated by a dielectric material of the plasma generator.

35. A method as claimed in claim 34 further comprising operating the plasma generator in steady state or unsteady modes.

36. A method for operating a trailing edge vortex reducing system, the method comprising:
   energizing one or more spanwise extending plasma generators in a trailing edge region of a gas turbine engine airfoil,
   the airfoil extending in a chordwise direction between a leading edge and a trailing edge of the airfoil and extending outwardly in a spanwise direction from an airfoil base to an airfoil tip,
   the airfoil extending radially in a spanwise direction between radially inner and outer bands,
   the airfoil having pressure and suction sides extending in the chordwise direction between the leading edge and the trailing edge, and
   the trailing edge region extending around the trailing edge and including a trailing edge base at the trailing edge.

37. A method as claimed in claim 36 wherein the energizing further includes supplying an AC potential to inner and outer electrodes separated by a dielectric material of the plasma generators.

38. A method as claimed in claim 37 further comprising operating the plasma generator in steady state or unsteady modes.

39. A method as claimed in claim 36 further comprising using a first plurality of the plasma generators mounted on the pressure side of the airfoil and a second plurality of the plasma generators mounted on the suction side of the airfoil.

40. A method as claimed in claim 36 further comprising using a first one of the plasma generators mounted on the pressure side of the airfoil and a second one of the plasma generators mounted on the suction side of the airfoil.

41. A method as claimed in claim 40 wherein the energizing further includes supplying an AC potential to inner and outer electrodes separated by a dielectric material of the plasma generator.

42. A method as claimed in claim 41 further comprising operating the plasma generator in steady state or unsteady modes.

* * * * *